Sept. 13, 1966     M. F. VIGNEROT     3,272,133
PROPORTIONING APPARATUS
Filed April 22, 1963     3 Sheets-Sheet 1
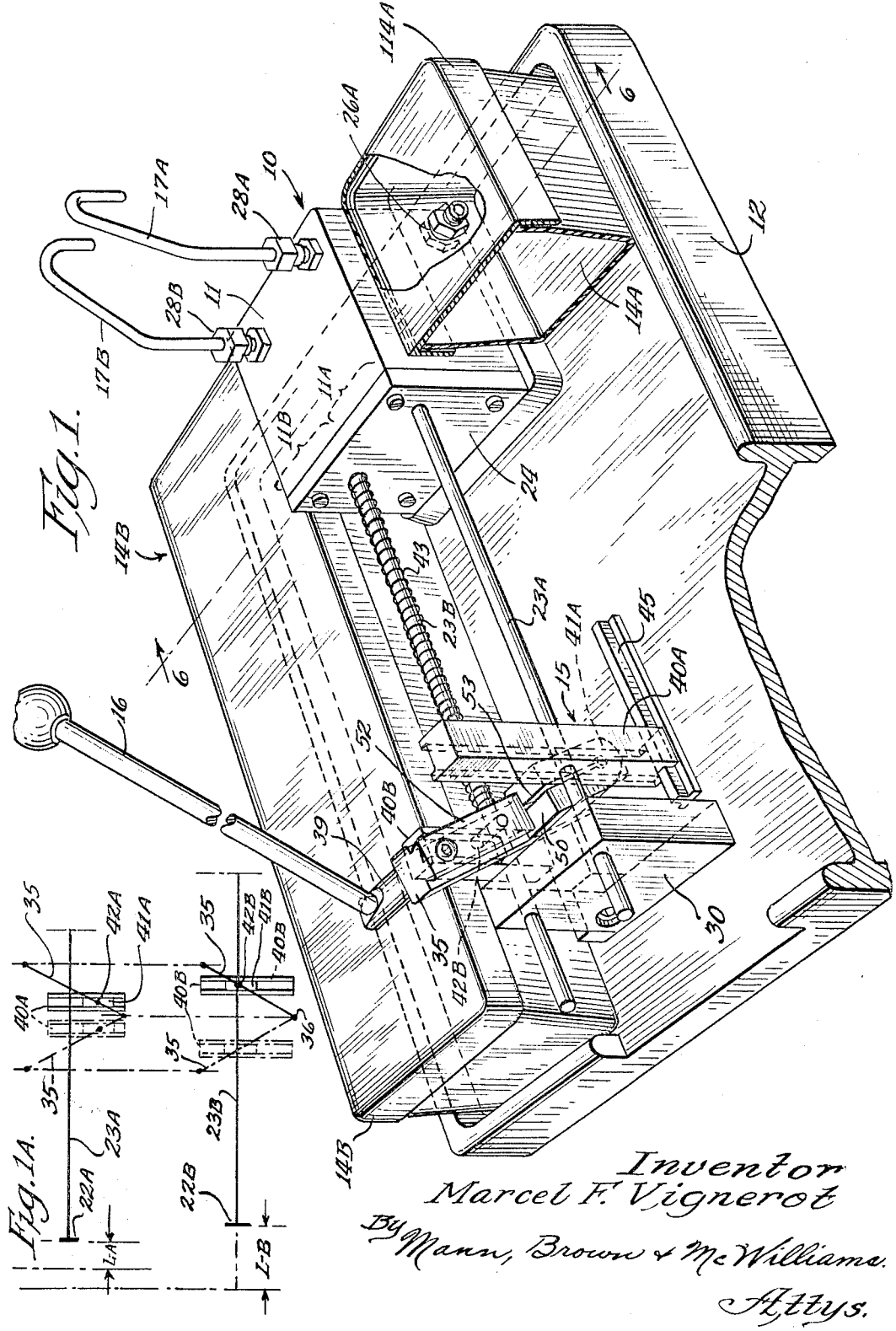
Inventor
Marcel F. Vignerot
By Mann, Brown & McWilliams
Attys.

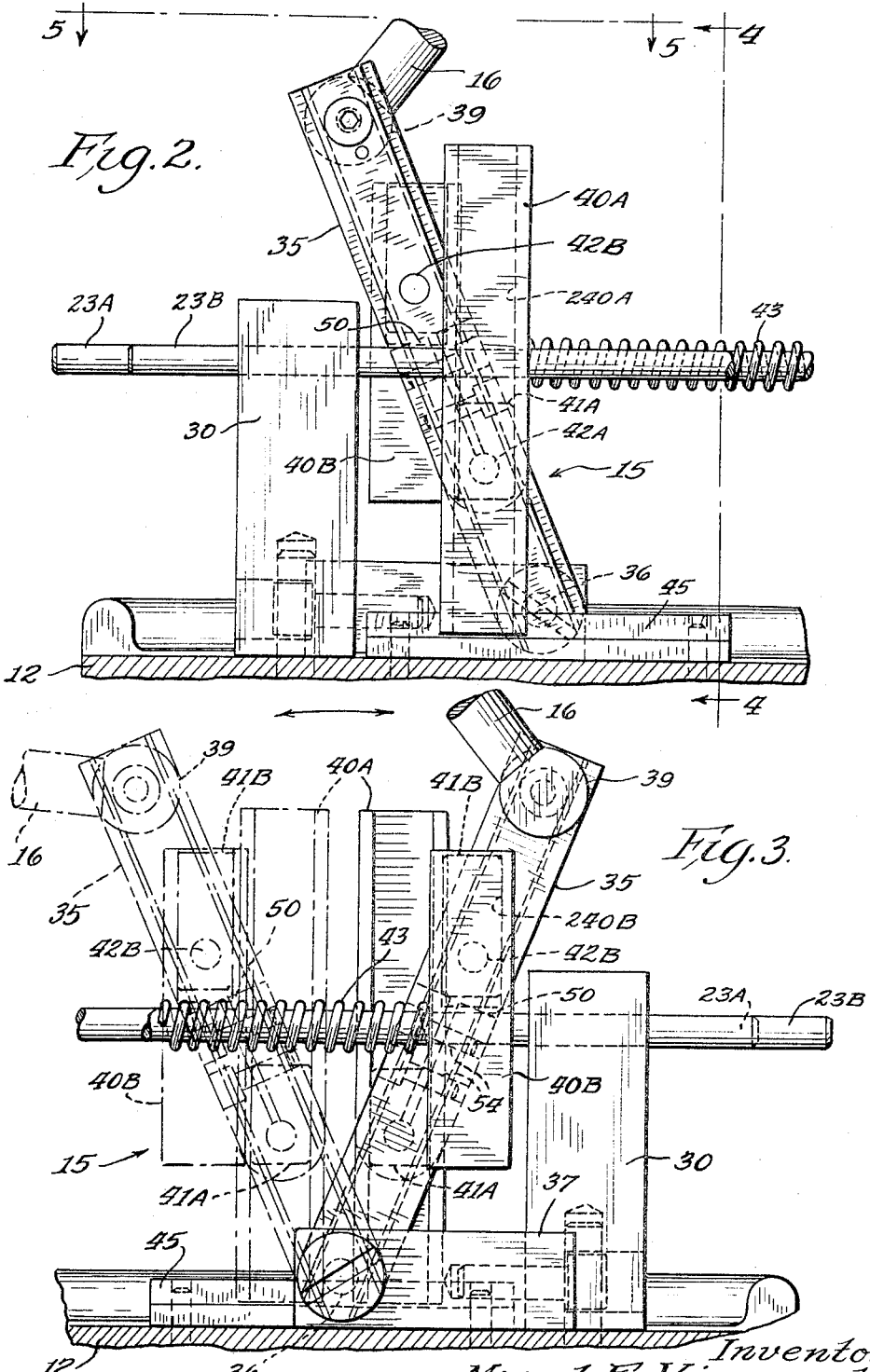

Sept. 13, 1966 M. F. VIGNEROT 3,272,133
PROPORTIONING APPARATUS
Filed April 22, 1963 3 Sheets-Sheet 3
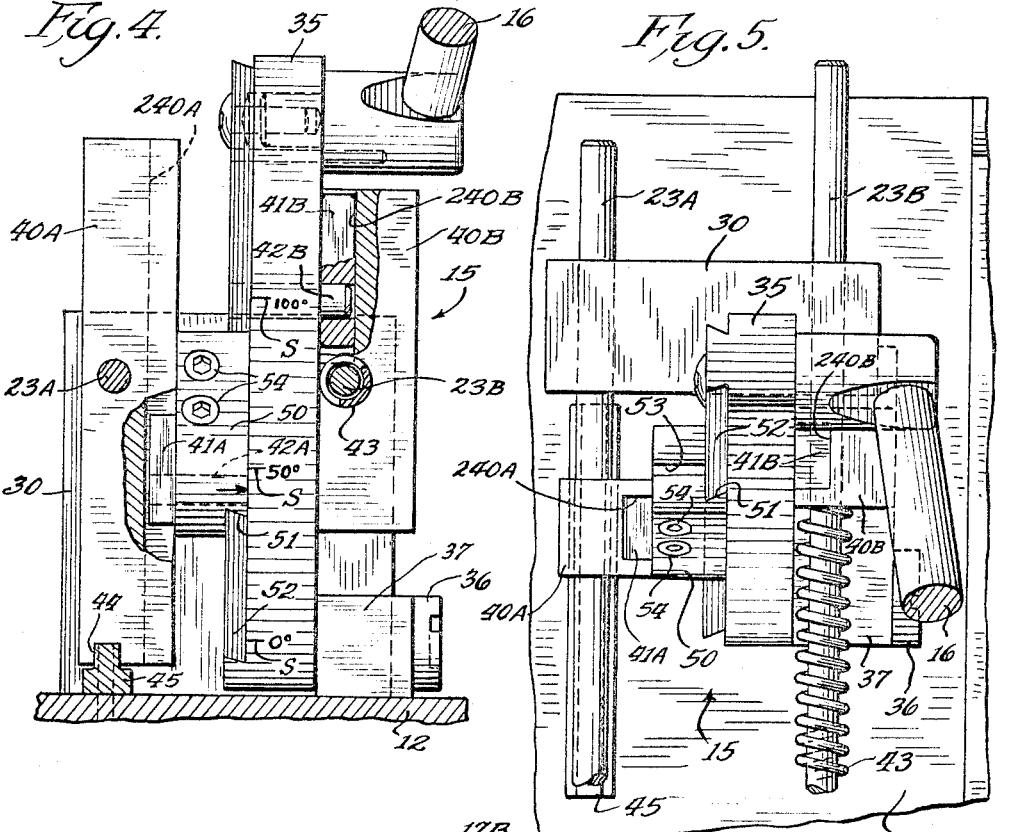
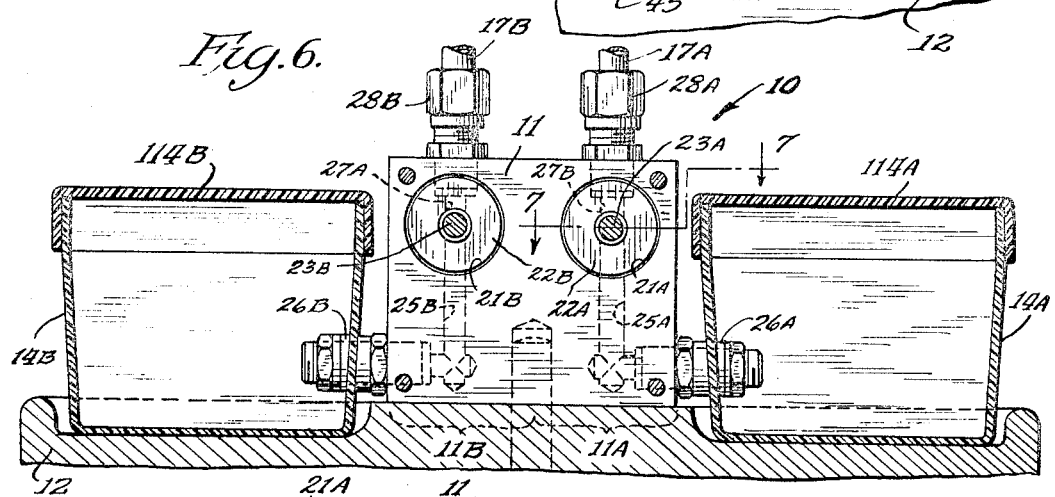
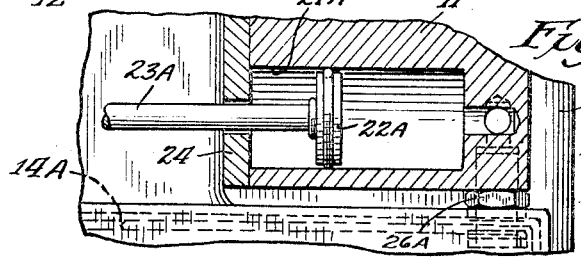
Inventor
Marcel F. Vignerot
By
Mann, Brown & McWilliams
Attys.

United States Patent Office
3,272,133
Patented Sept. 13, 1966

3,272,133
PROPORTIONING APPARATUS
Marcel F. Vignerot, 1910 Palmgren Drive, Glenview, Ill.
Filed Apr. 22, 1963, Ser. No. 274,416
3 Claims. (Cl. 103—11)

This invention relates to proportioning apparatus and particularly to proportioning pumps for supplying in preset proportions, the ingredients of a plastic caulking, sealing or encapsulating material.

Plastic materials of the aforesaid character are customarily supplied to the user in two separately packaged flowable components, one of which constitutes the base component and the other a hardener or catalyst, and when the base and hardener are mixed together in a predetermined proportion, the mixture will cure to a final state having the desired hardness or resiliency, or the like.

Curing of some such mixtures may take place within an interval of as little as thirty minutes, so that the material must be put in its position of use almost immediately after mixing, and therefore the components must either be mixed in small batches that can be used within this period, or must be mixed continuously at a rate approximating the rate of use. Such plastic materials or resins have gone into wide commercial use and have caused the development of a wide variety of proportioning and mixing devices intended to facilitate such use despite the recognized problems inherent in the short "pot life" of the materials.

The attainment of uniformity in the cured mixture requires uniformity of proportioning of the base and the hardener, and it is the primary object of the present invention to enable such proportioning to be readily and easily attained in those situations where small and variable quantities of such material are required periodically in a manufacturing process for sealing, coating, encapsulating and like operations.

Other and further objects of the present invention will be apparent from the following descriptions and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

FIG. 1 is a perspective view illustrating a proportioning unit embodying the features of the invention;

FIG. 1A is a diagrammatic view illustrating the operation of the unit;

FIG. 2 is an enlarged fragmentary side elevational view of one side of the pump actuating structure;

FIG. 3 is a view similar to FIG. 2 and showing the opposite side of the actuating structure;

FIG. 4 is a vertical sectional view taken along the line 4—4 of FIG. 2;

FIG. 5 is a plan view taken from the line 5—5 of FIG. 2;

FIG. 6 is a vertical sectional view taken along the line 6—6 of FIG. 1; and

FIG. 7 is a fragmentary plan sectional view taken along the line 7—7 of FIG. 6.

For purposes of disclosure the invention is herein illustrated as embodied in a manually operable proportioning unit 10 wherein a common cylinder block 11 forming part of a pair of piston and cylinder pumps 11A and 11B mounted at one end of a flat bed 12 between a pair of pan-like supply containers 14A and 14B, and an adjustable pump actuating structure 15 mounted on the bed 12 near its other end and including an operating handle 16 which may be manually actuated to discharge base material and hardener in a predetermined proportion from pump discharge pipes 17A and 17B.

In providing the pumps 11A and 11B, the cylinder block 11 has parallel bores or cylinders 21A and 21B formed therein, and disk-like pistons 22A and 22B slidable in the respective cylinders have piston rods 23A and 23B fixed thereto and slidably extended through a removable cylinder head plate 24. Inlet passages 25A and 25B for the cylinders 21A and 21B are detachably connected by inlet check valve fittings 28A and 28B to the pump discharge pipes 17A and 17B.

The containers 14A and 14B are intended respectively to be filled with hardener and base material, and removable covers 114A and 114B are provided for closing the containers; and because it is contemplated that the wrong component may at some time be poured into one of the containers, the fittings 26A and 26B are removably associated therewith so as to enable the containers to be quickly removed for cleaning or replacement.

Near the left hand end of the bed 12 the piston rods 23A and 23B extend slidably through an upstanding bearing block 30 so that the piston rods are supported in parallel relation and it is adjacent the bearing block 30 that the actuating structure 15 is operatively associated with the two piston rods.

Under and in accordance with the present invention the actuating structure 15 is so constructed and arranged that when the handle 16 is actuated the two pistons 22A and 22B are at all times moved simultaneously at rates that may be identical or that may be set to different ratios so as to enable the hardener and the base material to be discharged in the desired ratio. Thus, the actuating structure 15 has an actuating lever 35 disposed between the piston rods 23A and 23B and relatively close to the rod 23B as will be evident in FIGS. 4 and 5. At its lower end the lever 35 has a headed pivot stud 36 mounted in a fixed bearing block 37 on the bed 12 so that the axis of the stud is horizontal and perpendicular to the axis of the piston rod 23B.

Thus the lever 35 may be rocked about its pivot 36 in a vertical plane parallel to the piston rods 23A and 23B, and this is accomplished by the handle 16 which is attached to the upper end of the lever 35 by means including a lateral stud 39. In such rocking movement the lever 35 imparts the desired movement to the two piston rods 23A and 23B, simultaneously, and in the desired ratio, as will now be described.

Thus the piston rod 23B has a vertically extending cross head 40 fixed thereon so that one face 140B thereof rides slidably against the adjacent flat side face of the lever 35. This engagement of the adjacent faces of the lever 35 and the cross head 40B acts to hold the cross head in a vertical relation, and in the face 140B, a vertical groove 240B is provided in which a slide block 41B may reciprocate. A pin 42B extends horizontally through the lever 35 and into the slide block 41B, thus to complete an actuating connection between the lever 35 and the piston rod 23B. In the present instance the range of movement of the piston 22B is limited by engagement of the piston 22B with opposite ends of the cylinder 21B. An expansive coil spring 43 surrounds the piston rod 23B and acts between the head plate 24 and the cross head 40B to urge the piston 22B to the end of its stroke in an intake direction, and the actuating lever 35 and all moving parts connected thereto are correspondingly urged to normal or rest positions shown in FIG. 1.

The actuating lever 35 is also connected to the piston rod 23A, and this connection is adjustably settable so that the ratio of the movements of the pistons may be changed. Thus, the piston rod 23A has an elongated vertical cross head 40A fixed thereon, the lower end of the cross head having a groove 44 therein slidably embracing and riding along a stationary guide rail 45 on the bed 12 so as to hold the cross head 40A against rotation on the axis of the piston rod 23A.

In the side thereof that is closest to the actuating lever 35, the cross head 40A has a vertical guide groove 240A, and a slide block 41A reciprocable in the groove 240A is carried on a pin 42A that is fixed in an adjusting head 50. The adjusting head 50 has a dovetail groove 51 formed longitudinally therein to slidably embrace a complemental dovetail rib or guide 52 formed on the adjacent face of the lever 35, as will be evident in FIGS. 1, 4 and 5 of the drawings, and the head 50 has a vertical slot 53 extending downwardly from its upper end so that by means of socket head screws 54, the upper portions of the dovetail groove 51 may be clamped onto the guide 52. Hence the adjusting head 50 may be set and clamped in any desired position along the actuating lever 35.

With the structure thus provided, the common actuating lever 35 acts through an arm of fixed length to impart movement to the piston 22B and simultaneously acts through an arm of adjustable length to impart movement to the piston 22A; and regardless of whether or not the lever 35 is actuated through its full range, the movement of the pistons 22A and 22B is always in the same ratio that has been determined by the setting of the adjusting head 50.

As an example, it will be observed in FIG. 1A that the lever arm that is effective to actuate the piston rod 23B constitutes the distance between the pivot pins 36 and 42B, and this lever arms serves to actuate the piston 22B through a maximum stroke having a length L–B. In contrast, however, the pivot pin 42A has been set, as shown in FIG. 1A, so that the lever arm between the pivot pins 36 and 42A is equal to about forty percent of length of the lever arm 36–42B. Such adjustment or setting may be facilitated by suitable scale markings S on the lever 35 and the adjusting head 50, as shown in FIG. 4 of the drawings.

With the adjustment thus described with respect to FIG. 1A, movement of the piston 22B through its full stroke LB produces a stroke L–A in the piston 22A that is equal to forty percent of the stroke LB. Thus the base material and the hardener will be delivered in the ratio of 100 to 40. This same ratio of component delivery will be maintained even if the piston 22B is moved through but a small portion of its stroke, and this is of great importance where small and variable quantities must be mixed.

Other delivery ratios may be readily attained by appropriate re-setting or adjustment of the adjusting head 50.

From the foregoing description it will be apparent that the present invention provides a new and improved proportioning apparatus adapted for use in preparing small and variably sized quantities of sealing or encapsulating resins, and it will also be evident that the present apparatus will deliver the components of the mixture in the desired proportion even when less than the maximum pump output is required.

It will also be apparent that the present proportioning unit may readily be re-set or adjusted to vary the ratio of the components to be delivered thereby, and that these novel and advantageous operations of the present unit is attained by simple and rugged structure which will give long and dependable service.

Thus, while a preferred embodiment of the invention has been illustrated herein, it is to be understood that changes and variations may be made by those skilled in the art without departing from the spirit and scope of the appended claims.

I claim:
1. In a proportional pumping unit for delivering the components of a resin in predetermined proportions, a pair of piston and cylinder pumps having supply containers associated respectively therewith by check valved inlet connections and having check valved outlet connections, parallel piston rods connected to the respective pumps for operating the same, an operating lever disposed between said piston rods and pivoted on an axis perpendicular to the axes of the piston rods and parallel to and spaced substantially from the plane of said piston rods, cross heads fixed on the respective piston rods and having longitudinal guide grooves therein facing opposite sides of said lever, slide blocks reciprocable in the respective guide grooves of said cross heads, and a pivot pin extending from one side of said lever and connecting one of slide blocks to said lever, an adjusting head disposed on the other side of said lever and having a pivot pin connecting the adjusting head to the other one of said slide blocks, and means for securing said adjusting head in different positions along said lever.

2. In a proportional pumping unit for delivering the components of a resin in predetermined proportions, an elongated mounting bed, a cylinder block mounted at one end of the bed midway between the sides thereof and making a pair of parallel cylinders therein disposed in the same horizontal and extending parallel to the sides of the bed, pistons reciprocable in said cylinders to provide a pair of piston and cylinder pumps, supply containers disposed on said bed on opposite sides of the block and between the block and the sides of the bed and detachably associated respectively with said cylinders by check valved inlet connections, said cylinders having check valved outlet connections, parallel piston rods connected to the respective pistons for operating the pistons, a bearing block supporting said rods on said bed remote from the cylinder block, an operating lever disposed between said bearing block and said cylinder block and between said piston rods and pivoted on said bed on the axis perpendicular to the axes of the piston rods and parallel to and spaced substantially downwardly from the plane of said piston rods, cross heads fixed on the respective piston rods and having longitudinal guide grooves therein facing opposite sides of said lever, slide blocks reciprocable in the respective guide grooves of said cross heads, a pivot pin extending from one side of said lever and connecting one of slide blocks to said lever, an adjusting head disposed on the other side of said lever and having a pivot pin connecting the adjusting head to the other one of said slide blocks, and means for securing said adjusting head in different positions along said lever.

3. In a proportioning unit of the character described, a mounting bed, a cylinder block fixed on the bed and having a pair of parallel cylinders therein, pistons reciprocable in said cylinders to provide a pair of piston and cylinder pumps, supply containers disposed on said bed on opposite sides of the cylinder block and detachably associated respectively with said cylinders by check valved inlet connections, said cylinders having check valved outlet connections, parallel piston rods connected to the respective pistons for operating the pistons, guide means supporting said rods on said bed remote from the cylinder block, an operating lever disposed between said guide means and said cylinder block and between said piston rods and pivoted on said bed on an axis perpendicular to the axes of the piston rods and parallel to and spaced substantially downwardly from the plane of said piston rods, cross heads fixed on the respective piston rods and having longitudinal, vertically extending guide grooves therein facing opposite sides of said lever, slide blocks reciprocable in the respective guide grooves of said cross heads, and a pivot pin extending from one side of said lever and connecting one of slide blocks to said lever, and a pivot pin connected to the other slide block and mounted on the other side of said lever adjustment to different positions along said lever for varying the ratio of movement of the pump pistons.

References Cited by the Examiner

UNITED STATES PATENTS

| | | | |
|---|---|---|---|
| 2,197,730 | 4/1940 | Mugford | 103—38 |
| 2,259,587 | 10/1941 | Rush | 103—38 |
| 2,565,255 | 8/1951 | Morine | 103—38 |
| 2,615,398 | 10/1952 | Howard | 103—38 |
| 2,627,453 | 2/1953 | Sheen | 103—38 |
| 2,672,405 | 3/1954 | Sheen | 103—11 |
| 2,895,644 | 7/1959 | Pande | 103—11 |
| 2,925,780 | 2/1960 | Tear | 103—11 |
| 3,116,852 | 1/1964 | Anderson | 222—145 |

FOREIGN PATENTS

| | | |
|---|---|---|
| 120,199 | 5/1901 | Germany. |
| 164,723 | 11/1905 | Germany. |

LAURENCE V. EFNER, *Primary Examiner.*